United States Patent [19]

Strange-Hansen

[11] 3,818,867
[45] June 25, 1974

[54] TEAT CUP

[76] Inventor: Poul Strange-Hansen, Horne, DK-Varde, Denmark

[22] Filed: Apr. 6, 1973

[21] Appl. No.: 348,595

[52] U.S. Cl. .......................................... 119/14.47
[51] Int. Cl. .............................................. A01j 5/06
[58] Field of Search.......... 119/14.47, 14.48, 14.49, 119/14.5, 14.51, 14.52

[56] References Cited
UNITED STATES PATENTS
2,073,737  3/1937  Ellison ........................... 119/14.49
2,484,696  10/1949  Dinesen ........................ 119/14.53
3,079,891  3/1963  Miller ............................ 119/14.5

Primary Examiner—Hugh R. Chamblee
Attorney, Agent, or Firm—Burns, Doane, Swecker & Mathis

[57] ABSTRACT

A teat cup adapted to fit on milk cows and used in connection with milking machines comprising a transparent plastic tubular member with an annular metal body that fits loosely over the tubular member and is held axially in place between a shoulder on the tubular member and a reverse collar part of the rubber liner. Leakage is prevented by use of an O-ring and relative rotation is prevented by a boss and slot between the plastic member and the metal body.

1 Claim, 1 Drawing Figure

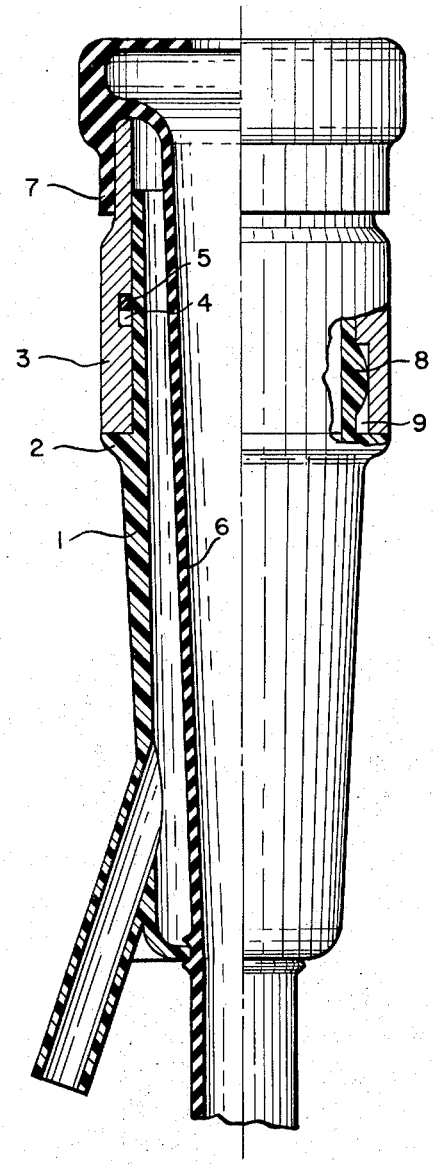

TEAT CUP

This invention relates to an improved teat cup for an automatic cow milking machine.

Teat cups made of a substantially tubular shell of plastic material have the advantage of being inexpensive and may be made transparent. However, the prior teat cups of this type are not sufficiently heavy, and it is therefore necessary to increase the weight of the cup, as by use of a metal body.

It has been suggested to use a tubular metal body press fitted over part of the plastic shell. This construction has been found to cause squeezing forces which in turn cause the plastic shell to crack in the course of time. To avoid this drawback, it has been suggested to remove material and thereby provide an annular chamber between the plastic shell and the metal body. The chamber containing the metal body was closed by a tap cover which was welded to the shell as by use of sonic welding. However, it was found that cracking due to squeezing forces still occurred, and that the welded joint also became leaky.

The object of the present invention is to provide a novel teat cup of the above-mentioned kind in which the metal body will not cause damage to the plastic shell.

It is a further object to provide a novel teat cup construction which employs an O-ring between the walls of the plastic shell and the walls of the metal body with the metal body being axially fixed between a flange on the shell and a collar on the rubber liner that is in the shell.

A further object of this invention is to provide a novel and improved teat cup of the foregoing type wherein rotation of the metal body on the shell is prevented to thereby avoid unfavorable conditions when milking and further reduce the likelihood of causing the rubber liner to split.

These and other objects of the invention will become more fully apparent from the claims, and from the description as it proceeds in connection with the single FIGURE which is an elevation in partial section showing the tubular teat cup of the present invention.

The teat cup comprises a tubular shell 1, preferably made of a transparent plastic material. At a distance from the upper end, the shell 1 has an outer flange 2, and near the lower end is a tubular appendage which is connected to the milking apparatus in a known manner. The outer wall of the tubular shell 1 above flange 2 is substantially cylindrical and the lower end of the tubular shell 1 is necked in as illustrated to fit between two annular ridges on the interior rubber liner 6.

Surrounding the upper end of tubular shell 1 is a tubular metal body 3 which has a substantially cylindrical inside surface that fits over the outside surface of the tubular shell 1. The inner wall of the metal body 3 has a circular groove 4 in which an O-ring 5 is placed. The O-ring 5 engages the outer wall of tubular shell 1 to form a sufficiently tight seal to allow the milking operation to be carried out by means of the pulsating fluid pressures produced in the chamber between the outside wall of rubber liner 6 and the inside wall of tubular shell 1.

The rubber liner 6 and its lower portion, which extends below the tubular shell 1, is introduced from the top of the shell and is provided with a reverse collar 7 catching the upper rim of the metal body 3. By pulling rubber liner 6 to its intended position with respect to the lower end of tubular shell 1, the inside portion of the reverse collar 7 positions the metal body 3 against flange 2 of the tubular shell 1 so that metal body 3 is fixed against axial movement. After the rubber liner 6 is introduced into the tubular shell 1, the collar 7 on the rubber liner 6 will keep metal body 3 in place. When the rubber liner 6 is removed, metal body 3 may also be removed.

From the foregoing construction, it is apparent that the plastic shell 1 will not be destroyed by the compressive or squeezing forces caused by metal body 3. Also, the construction of the present invention provides for easy disassembly and replacement of any parts which may be damaged. In particular, the tubular shell 1 can easily be replaced when it is no longer transparent.

It has been found that when the construction as described above has been used, metal body 3 can rotate relative to tubular shell 1 and thereby cause twisting of rubber liner 6, which can result in the splitting or rupture of the rubber liner. To prevent relative rotation, the tubular shell 1 may be formed with a boss 8, and tubular metal body 3 formed with an axial groove 9 so that when tubular shell 1 and metal body 3 are assembled, the metal body 3 cannot rotate relative to the shell 1.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the maning and range of equivalency of the claims are therefore intended to be embraced therein.

What is claimed and intended to be covered by letters Patent is:

1. A teat cup comprising a substantially tubular shell made of a plastic material having an upper cylindrical end portion extending above a central portion having a flange on an outer wall thereof, a metal body having a cylindrical inner surface which surrounds the upper end portion of said tubular shell and has one end abutting against said flange, means for preventing relative rotation between said tubular shell and said metal body comprising an outstanding boss on the upper end portion of the tubular shell and an axial groove in the inner wall of the metal body cooperating with said boss, a rubber liner extending through the tubular shell and having a collar at its upper end which fits tightly over the upper end of said metal body to provide a fluid tight joint, and which together with said flange prevents axial movement of the metal body relative to the tubular shell, and means to provide a fluid tight seal between the tubular shell and the metal body including an O-ring located between the outer surface of the tubular shell upper end portion and the inner surface of said metal body.

* * * * *